United States Patent [19]
VanDenberg

[11] Patent Number: 5,908,198
[45] Date of Patent: *Jun. 1, 1999

[54] CENTER BEAM SUSPENSION SYSTEM

[75] Inventor: Ervin K. VanDenberg, Massillon, Ohio

[73] Assignee: Meritor Heavy Vehicle Systems, LLC, Troy, Mich.

[*] Notice: This patent is subject to a terminal disclaimer.

[21] Appl. No.: 08/980,462

[22] Filed: Nov. 28, 1997

Related U.S. Application Data

[62] Division of application No. 08/756,947, Dec. 2, 1996, Pat. No. 5,746,441.

[51] Int. Cl.$^6$ .................................................. B60G 7/00
[52] U.S. Cl. .................................. 280/124.1; 280/124.11; 180/209
[58] Field of Search ........................... 280/124.11, 124.1, 280/683, 678; 189/209; 267/256, 241

[56] References Cited

U.S. PATENT DOCUMENTS

| | | | |
|---|---|---|---|
| 3,133,745 | 5/1964 | Granning | 280/112 |
| 3,380,758 | 4/1968 | Granning | 280/711 |
| 3,420,543 | 1/1969 | Strifler et al. | 280/713 |
| 3,689,102 | 9/1972 | Granning | 280/112 R |
| 3,713,663 | 1/1973 | Granning | 280/112 R |
| 3,747,948 | 7/1973 | Granning | 280/112 R |
| 4,171,830 | 10/1979 | Metz | 280/711 |
| 4,248,447 | 2/1981 | Hart | 280/112.1 |
| 4,415,179 | 11/1983 | Marinelli | 280/713 |
| 5,039,124 | 8/1991 | Widmer | 280/711 |
| 5,112,078 | 5/1992 | Galazin et al. | 280/711 |
| 5,133,575 | 7/1992 | Zantinga et al. | 280/708 |
| 5,332,258 | 7/1994 | Buttner | 280/86.5 |
| 5,366,237 | 11/1994 | Dilling et al. | 280/711 |
| 5,403,031 | 4/1995 | Gottschalk et al. | 280/704 |
| 5,540,454 | 7/1996 | VanDenberg et al. | 280/81.1 |
| 5,588,665 | 12/1996 | Pierce et al. | 280/86.5 |

FOREIGN PATENT DOCUMENTS

| | | |
|---|---|---|
| 952136 | 7/1974 | Canada . |
| 1389149 | 11/1973 | Germany . |

*Primary Examiner*—Christopher P. Ellis

[57] ABSTRACT

A vehicle suspension system having a central beam formed with a mounting flange on each side thereof. The beam is pivotally mounted to a suspension frame at one end, and rigidly attached to an axle at another end along substantially the entire length of the axle. A control arm is pivotally mounted to each mounting flange at one end, and to the suspension frame at another end whereby the pivot axis of the center beam and the control arms are axially aligned. Additionally, the pivot connection of the central beam provides one or two bushings which may have a constant spring rate, or which may include a spring rate which varies in the vertical and horizontal direction. In a second and third embodiment, a lift mechanism is provided for raising the axle from a ground engaging to a non-ground engaging position.

8 Claims, 7 Drawing Sheets

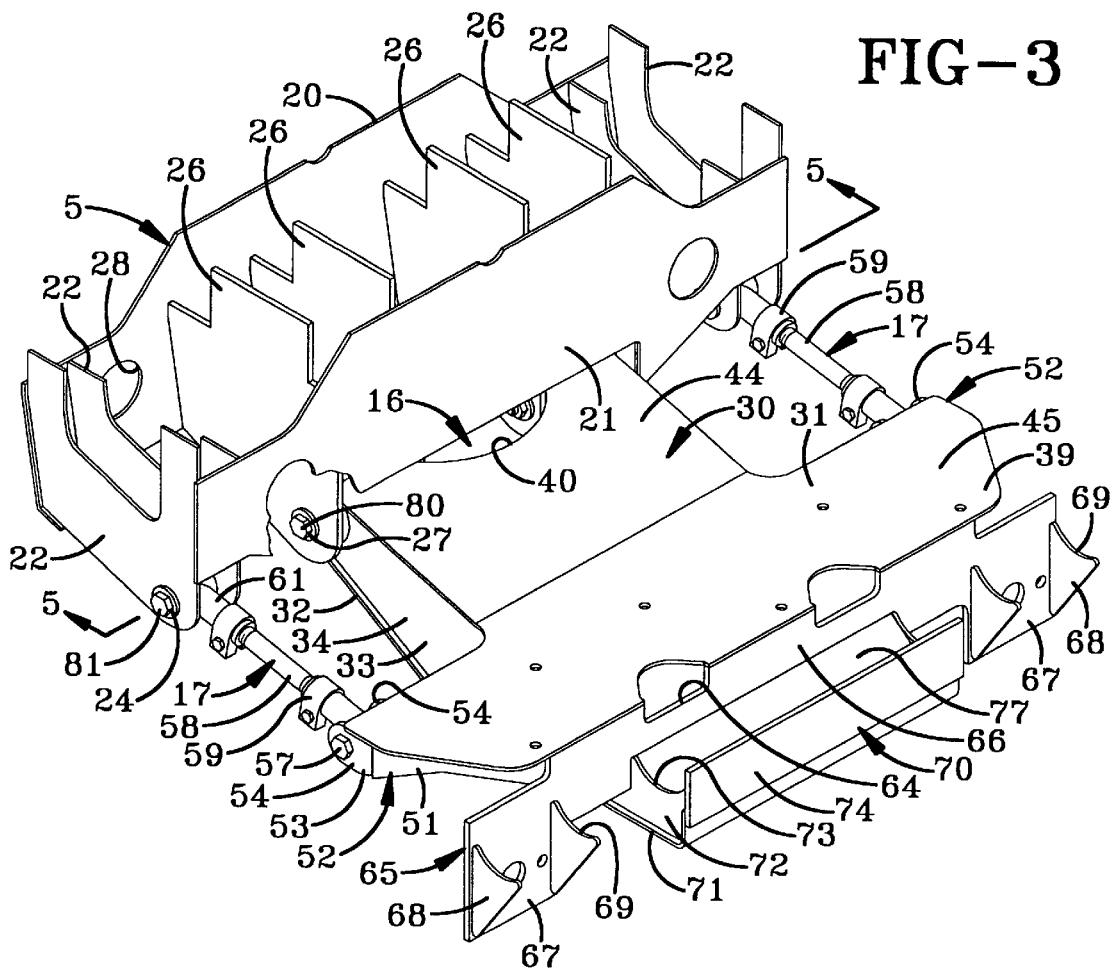
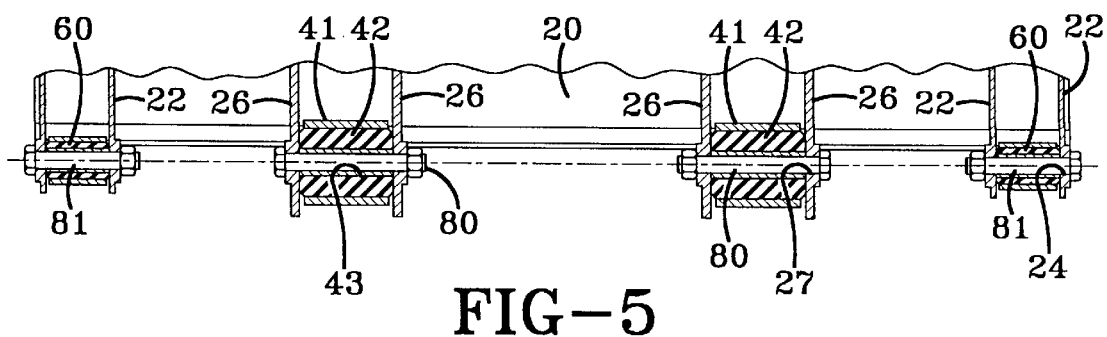

CENTER BEAM SUSPENSION SYSTEM

This application is a division of application Ser. No. 08/756,947, filed Dec. 2, 1996, which application is now: U.S. Pat. No. 5,746,441.

BACKGROUND OF THE INVENTION

1. Technical Field

The invention relates generally to an improved suspension system for land vehicles. More particularly, the invention relates to trailing beam air suspension systems. Specifically, the invention relates to trailing beam air suspension systems having a center beam.

2. Background Information

With the advent following World War II of large load carrying capacity trucks and trailers in this country, came the need to provide vehicles with multiple axles for increasing the capacity of trucks over that of previously existing designs. While the use of additional axles effectively increased load-carrying capacity, it was soon realized that as the number of load bearing axles increased on a given vehicle, a number of difficulties arose. Specifically, tire scuffing, loss in fuel economy and the inability to safely corner, all work problems associated with multiple axle vehicles. Mitigation of these problems was a primary concern to the industry, which concern resulted in the development of a variety of suspension systems, both liftable and non-liftable. Liftable suspensions could be selectively raised from the road surface or lowered into engagement with the road surface when needed, thereby mitigating a number of the aforementioned problems. Additionally, non-liftable axles have been designed for a variety of purposes, and specifically a number of specialty chassis-cab type vehicles require additional load-carrying capacity. More specifically, auxiliary suspension systems are necessary for trash compactor trucks and concrete mixing and delivery vehicles. Cab-chassis trucks of this type require additional suspensions as the truck has a relatively large weight when compared to the overall vehicle length.

Suspension systems may take a variety of forms, including parallelogram suspensions, and leading and trailing beam-type suspensions. Generally, leading and trailing beam-type suspensions include a pair of longitudinally extending beams which may be either flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam suspension respectively.

Beam-type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, shear stress acts between the tire and the road surface causing a lateral stress to be transferred through the tire-wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Roll stability refers to the counter-acting forces operating on the ends of an axle causing one end of the axle to raise relative to the frame a distance greater than the other end of the axle. Roll instability is encountered when the vehicle frame tilts or rolls relative to the axle; for example, when the vehicle negotiates a turn such that the centrifugal and acceleration forces reduce the downward forces acting on the inside wheel of the turn, and increase the downward force acting on the outside wheel of the turn. Roll instability is also realized when the axle moves relative to the frame; for example, during diagonal axle walk.

Diagonal axle walk occurs when the wheels of the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be roll rigid, and may cause axle breakage or over stress vehicle components, such as the frame. As such, beam-type suspensions must be roll stable while providing sufficient vertical support to retain the vehicle above the road surface.

Further, most vehicles designed with a beam-type suspension have a path of travel which is parallel to the frame rails extending longitudinally under the vehicle. For vehicles having only a front and a rear axle, the vehicle path of travel is generally defined by the parallel and spaced apart rear tires such that the direction of travel of the rear tires defines the path of travel of the vehicle. For vehicles having only a front and a rear axle, this path of travel is adequate and safe even if the rear tires are not positioned parallel with the vehicle frame rails. However, when multiple axles are utilized, such as when auxiliary suspension systems are provided on a vehicle, the path of travel of each axle must be aligned with the line of travel of the remaining axles carried by the vehicle for safe vehicle operation.

Specifically, if one axle is aligned with the longitudinal frame rails extending under the vehicle, and a second axle is offset relative to the longitudinal frame rails of the vehicle, as the vehicle moves over the road surface, one axle and its associated tire-wheel assemblies will track along the path of travel of the vehicle, while the second axle, which includes tire-wheel assemblies which do not rotate in a direction parallel to the path of travel of the vehicle, will drag under the vehicle increasing tire scuffing, tire wear, and creating a generally unsafe condition. When multiple axles are utilized, generally all tires affect the vehicle path of travel to some degree such that if one axle is offset relative to the vehicle path of travel, all tires will scuff, and drag under the vehicle. Additionally, as the tires drag under the vehicle due to their misalignment, they continually add lateral forces to the suspension system, and consequently to the vehicle frame substantially reducing the life span of both the vehicle frame and suspension system components.

However, if the axles are aligned relative to the frame rails such that the tires rotate in a line parallel to the vehicle path of travel, the tire-wheel assemblies will rotate smoothly under the vehicle substantially increasing vehicle safety and vehicle performance as well as substantially increasing tire life.

For the above reasons, and specifically for safety and vehicle performance, it is necessary that each axle be carefully aligned with the vehicle, and with other load bearing axles carried by the vehicle to present a plurality of parallel and spaced apart tire-wheel assemblies for engaging the road surface and defining the precise direction of vehicle movement along the vehicles path of travel. Such alignment is difficult for a number of reasons. Trailers as well as suspension systems may be manufactured out of tolerance, vehicle frame rails may not be perfectly parallel, and suspension systems may not be accurately mounted to the frame rails. These problems may be especially pronounced when suspension systems are added to existing equipment which may have experienced significant use.

Thus, to accommodate for the above inconsistencies in manufacturing and suspension system installation, an alignment mechanism is often included as part of the suspension system such that after the suspension system is installed on a vehicle, the axle may be moved relative to the vehicle to assure that the tire-wheel assemblies rotatably depending from the axle are substantially parallel to the vehicle path of travel. While a significant number of devices have been provided for this purpose, axle alignment continues to be a difficult process. Specifically, adjusting the axle relative to the beams has a number of problems associated therewith. Alignment of the axle relative to the beam often includes welding the adjustment collar to the mounting bracket after initial alignment. As such, it is difficult and expensive to realign the axle after the vehicle has been in service.

An additional problem associated with trailing beam type suspensions is the increased torque load which is input into the axle. More specifically, inasmuch as the beams are spaced apart a distance from 35 inches to 41 inches, and each beam pivot point receives between 20,000 and 30,000 pounds of force when engaging in roll or diagonal axle walk, with each beam length being approximately 20 inches, it is not uncommon for the axle to be subjected to 50,000 foot pounds of torque in the area intermediate the respective leading or trailing beams. The axle is thus subjected to extremely high torque loads substantially affecting the axle and its operational characteristics. Additionally, the central portion of the axle positioned intermediate the trailing beams is not reinforced, thereby further effecting the axle resistance to torque load.

The need thus exists for a suspension system which is lightweight, is roll stable, and provides adequate vertical load-carrying characteristics, and which is resistant to lateral and longitudinal axial forces. Additionally, the need exists for a suspension system which provides an axle to beam connection which is lightweight, easy to assemble, simple to manufacture and easy to align relative to the vehicle path of travel. Still further, the need exists for a suspension system which may be utilized as a tag axle, or alternatively as an auxiliary axle beneath a usual truck or trailer. The need also exists for a suspension system which substantially eliminates axle torque while strengthening the central portion of the axle.

SUMMARY OF THE INVENTION

Objectives of the invention include providing a vehicle suspension system which is roll stable, and resistant to lateral and longitudinal forces.

Another objective is to provide a suspension system which may be utilized as an auxiliary suspension or a principle suspension system under a usual truck or trailer.

Still another objective is to provide a vehicle suspension system which may be utilized as both a liftable and non-liftable suspension system.

A further objective is to provide a suspension system which utilizes a single beam and a pair of control arms attached to the beam.

Yet another objective is to provide a suspension system whereby the system may be easily adjusted to assure that the path of travel of the tire-wheel assemblies attached to the axle are parallel with the vehicle path of travel.

Yet a further objective is to provide a vehicle suspension system which will operate equally well on most vehicles.

Another objective is to provide a vehicle suspension system which provides a single beam attached to the axle along a relatively large portion thereof.

Yet another objective is to provide a suspension system whereby the pivot axis of the central beam is aligned with the pivot axis of the control arm.

Still a further objective of the invention is to provide a suspension system which substantially eliminates axle torque while simultaneously strengthening the axle along its entire length.

Still a further objective of the invention is to provide a suspension system having a single central beam, the characteristics of which may be varied to provide either a roll flexible or a roll stiff suspension system.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved auxiliary suspension system, the general nature of which may be stated as including an axle; a suspension frame; a central beam having a pair of sides extending between the axle and suspension frame; a control arm extending between the central beam and the suspension frame adjacent each side of the central beam; at least one air spring adapted to be positioned intermediate the central beam and the vehicle frame; and at least one hanger bracket adapted for extending from the vehicle frame and for supporting the suspension system.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 3 is an enlarged perspective view of the suspension system shown in FIG. 1 with the axle, tire-wheel, assemblies, and air springs removed with portions broken away;

FIG. 5 is a sectional view taken along line 5—5, FIG. 3;

Similar numerals refer to similar parts throughout the drawings.

DESCRIPTION OF THE PREFERRED EMBODIMENTS

Figure 1:
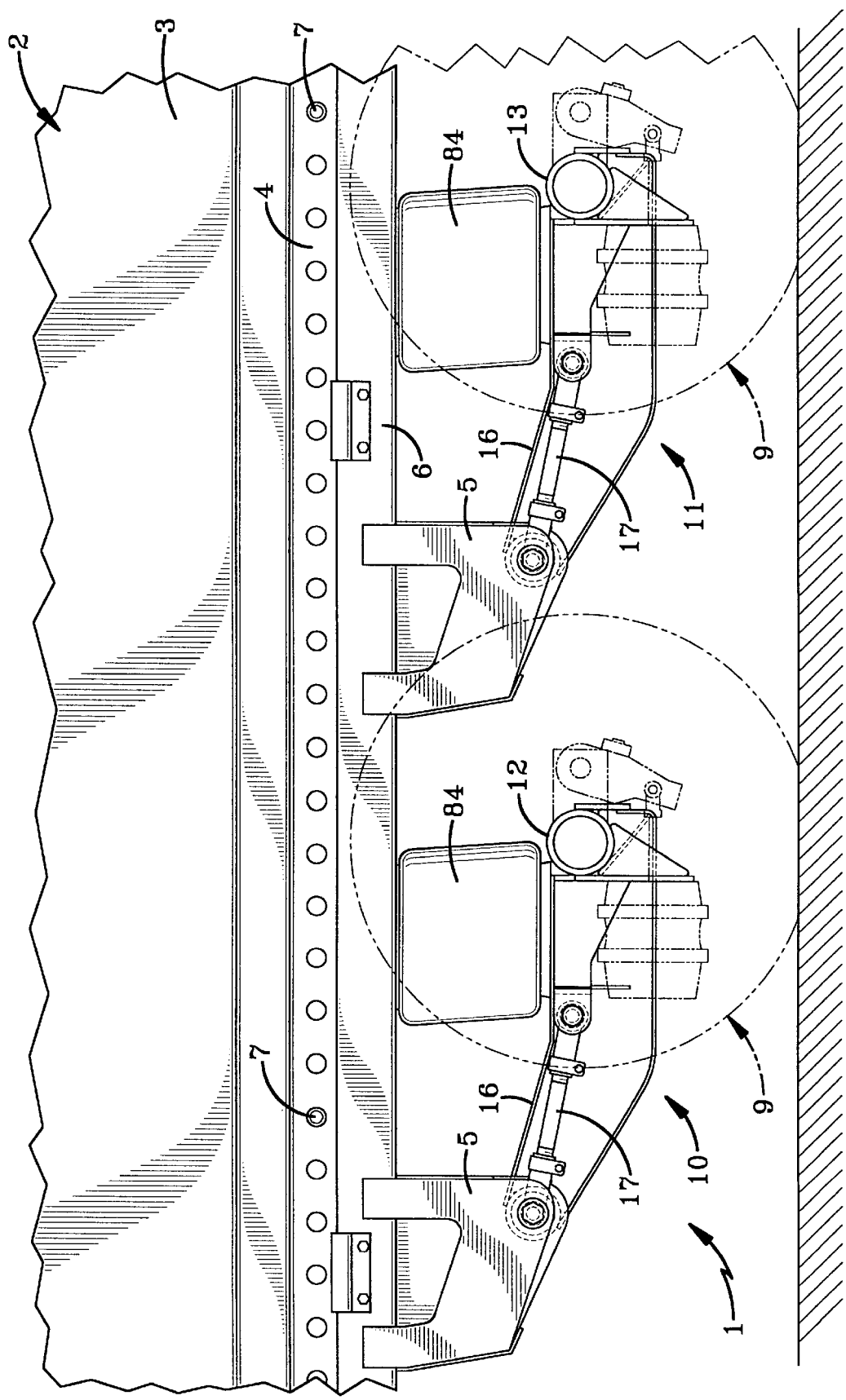
FIG. 1 is a side elevational view of the suspension system of the present invention shown attached to a vehicle and with the tire-wheel assembly shown in dot-dash lines.
Figure 2:
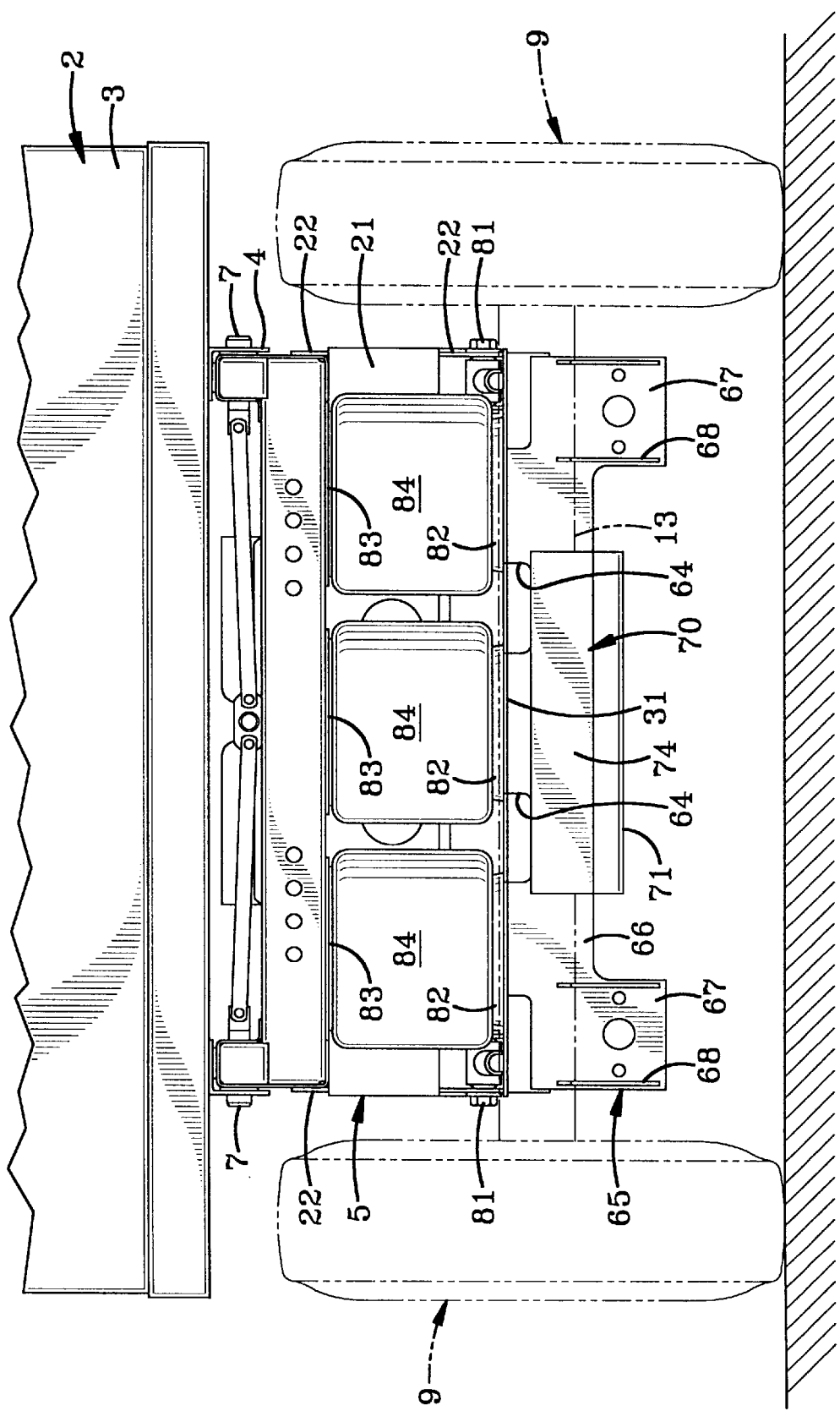
FIG. 2 is a rear end elevational view of the suspension system shown in FIG. 1.

The improved suspension system of the present invention is indicated generally at 1 and is particularly shown in FIGS. 1 and 2 and is particularly adapted to be mounted on a vehicle 2, such as a truck or trailer. Vehicle 2 includes a cargo box 3 supported by a pair of slider rails 4 extending longitudinally beneath vehicle 2. Suspension system 1 includes a suspension frame 5 welded to a pair of parallel and spaced apart slide channels 6. Slide channels 6 are spaced apart a distance equal to the distance between slider rails 4 and are mounted to slider rails 4 with a plurality of mounting pins 7. Suspension system 1 further includes a forward suspension 10 and a rearward suspension 11 for supporting a forward axle 12 and a rearward axle 13, respectively. Each axle 12 and 13 supports a tire-wheel assembly 9 at each end thereof. Inasmuch as both the forward and rearward suspensions 10 and 11 are similar, only forward suspension 10 will be described in detail.

Referring to FIGS. 1–5, forward suspension 10 includes the suspension system 1, a central beam 16 and a pair of parallel and spaced apart control arms 17. Suspension frame 5 includes a front plate 20 and a rear plate 21, parallel to and spaced apart from front plate 20. A pair of parallel and spaced apart hanger brackets 22 are positioned intermediate front plate 20 and rear plate 21 adjacent the ends thereof. Each pair of plates 22 are positioned apart a distance substantially equal to the width of slide channel 6 such that slide channel 6 may be welded thereto as shown specifically in FIG. 1. Additionally, each hanger bracket 22 is formed with an axially aligned hole 24 in the lower rear corner thereof. Two pair of parallel and spaced apart pivot flanges are positioned between front plate 20 and rear plate 21 and are formed with axially aligned holes 27, which holes 27 are also axially aligned with holes 24 formed in hanger brackets 22. Front plate 20 and rear plate 21 are formed with a plurality of holes 28 to reduce the weight of suspension system 1 and to provide access to the interior of suspension frame 5 for air and brake hoses.

Figure 4:
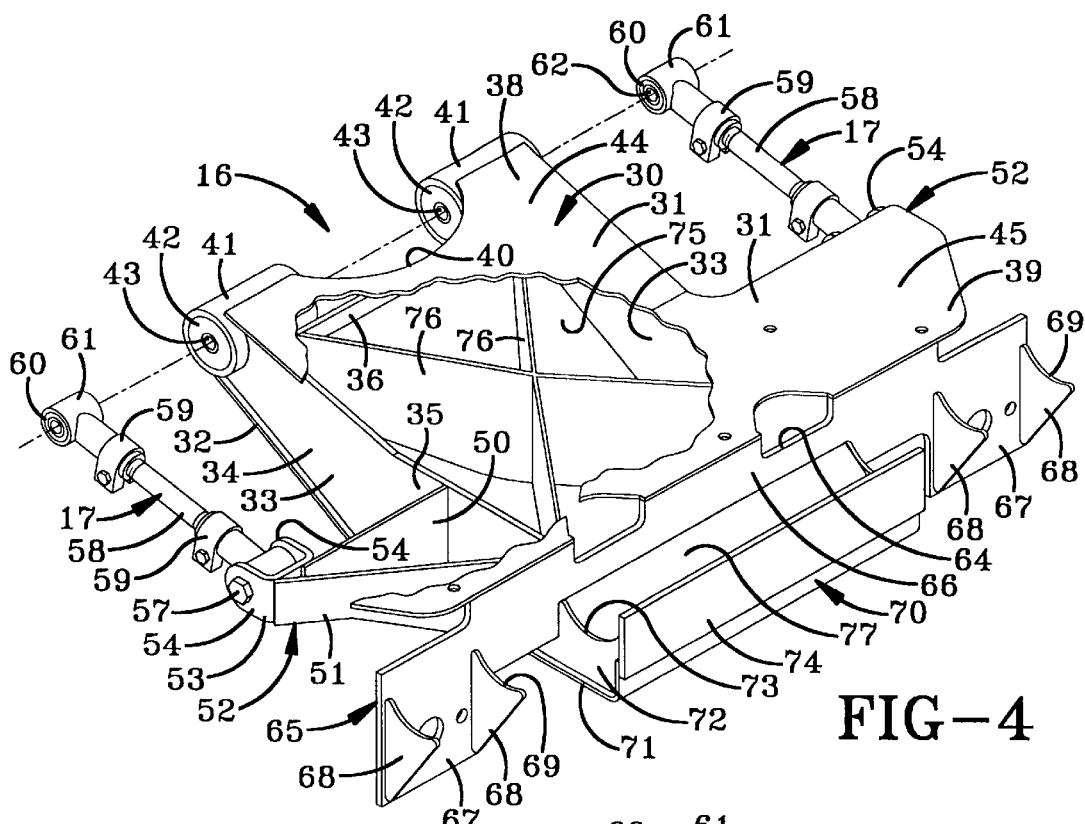
FIG. 4 is a perspective view of the center beam and control arms of the suspension system shown in FIG. 3 with the axle removed and with portions cut away.

In accordance with one of the main features of the present invention, and referring specifically to FIG. 4, central beam 16 includes a beam portion 30, and a pair of flanges having a top wall 31, a bottom wall 32 and a pair of parallel and spaced apart sidewalls 33. Sidewalls 33 include an inclined portion 34 and a substantially horizontal portion 35. Beam portion 30 includes a forward end 38 and a rear end 39 with inclined portion 34 extending upwardly from horizontal portion 35 toward forward end 38.

Forward end 38 of top wall 31 and bottom wall 32 is formed with a centrally positioned U-shaped arcuate recess. A forward wall 36 extends between sidewalls 3 and is substantially perpendicular thereto. A cylindrical outer housing 41 is also positioned intermediate top wall 31 and bottom wall 32, adjacent sidewalls 33 and on either side of the U-shaped arcuate recess and houses an elastomeric bushing 42. Outer housings 41 are spaced apart in the range of from 8 inches to 30 inches. Elastomeric bushing 42 is formed with an opening 43 whereby openings 43 are axially aligned. Elastomeric bushings 42 may have a constant spring rate in all directions, or alternatively may include a vertical spring rate, a horizontal spring rate and an axial spring rate whereby each of the vertical spring rate, axial spring rate and horizontal spring rate differ. The compliance of elastomeric bushing 45 may thus be tailored to the particular needs of suspension system 1. More particularly, the spring rate of bushing 42 may be increased if a roll rigid suspension is required, or decreased if a roll flexible suspension is required. Additionally, the distance between outer housings 41 may be varied to provide a more roll rigid or a more roll flexible suspension. Particularly, if tubular housings 41 and associated bushings 42 are moved further apart, the suspension will be more roll rigid, and if tubular housings 42 are moved closer together, the suspension system will be more roll flexible. As such, the position of bushings 42 as well as the spring rate of bushings 42 may be varied depending on the particular requirements of suspension system 1.

Top wall 31 includes a forward plate 44 and a rear plate 45 secured to sidewalls 33. Rear plate 45 extends well over sidewalls 33 and is supported via a pair of vertical gussets 50 and 51 extending outwardly from each sidewall 33. Gussets 50 and 51, and rear plate 45 combine to form a pivot flange 52 extending outwardly from each sidewall 33. Inasmuch as rear plate 45 extends over beam portion 30 of center beam 16 and pivot flanges 52, pivot flanges 52 are extremely rigid and resistant to deflection. A U-shaped bracket 53 having a pair of legs 54 is mounted to the forward end of each pivot flange 52. A control arms 17 is received between legs 54 of each U-shaped bracket 53 and is secured therebetween with a pivot pin 57. Control arms 17 may have a variety of sizes and configurations, but in the preferred embodiment, they are circular and include an adjustment mechanism for altering the length of each control arm 17. Still further, the adjustment mechanism is ordinarily a turn-buckle arrangement whereby rotation of a central bar 58 relative to the attachment ends 59 increases and decreases the length of each control arm 17. Still further, control arm 17 may be parallel, or be angled relative to one another without departing from the spirit of the present invention. Additionally, central beam portion 30 is centrally positioned intermediate control arms 17 and is of sufficient width to offer roll stability to suspension system 1.

A bushing 60 extends around pivot pin 57 for providing compliance between control arms 17 and pivot pin 57. Similarly, each control arms 17 has a free end 61 which houses a bushing 60 having a center aperture 62 extending therethrough whereby central aperture 62 of bushings 60 are axially aligned with central aperture 43 of bushings 42 housed within outer housings 41 such that center beam 16 and control arm 56 pivot about a common axis.

An axle cradle 65 is mounted to the rear end of central beam 16 and includes a vertical support wall 66 having a flange 67 extending outwardly from each end thereof. Vertical wall 66 also includes a plurality of cut-outs 64. Each flange 67 is provided with a plurality of outwardly extending support gussets 68 having an arcuate top edge 69 complementary shaped to receive axle 12. A center cradle 70 is provided which includes a bottom wall 71 and a pair of sidewalls 72 having a top edge 73 complementary shaped to receive axle 12. A weld plate 77 extends diagonally within center cradle 70 (FIG. 1), and operates to strengthen cradle 70 and allow it to support axle 12. A weld plate 74 extends upwardly from bottom wall 71 such that when axle 12 is positioned within axle cradle 65, it may be secured thereto via a weld at gussets 68, along top edge 69 at sidewalls 72, within cut-outs 64 and longitudinally along weld plate 74. In this manner, axle 12 is rigidly secured to axle cradle 65 and consequently to central beam 16. Additionally, this axle weld arrangement assures that axle 12 is welded to axle cradle 65 only along the axle equator, that portion of the axle subject to the lowest strain.

Top wall 31, bottom wall 32, sidewalls 33, forward wall 36, and support walls 66 all combine to form box-shaped central beam 16 having an interior cavity 75. A first strengthening rib 76 extends diagonally across central beam 16 within interior cavity 75 from the forward left corner to the rearward right corner while a second strengthening rib 76 extends diagonally across central beam 16 from a right forward corner to a left rearward corner forming an X-shaped strengthening rib within interior cavity 75. Strengthening rib 76 combine with top wall 31, bottom wall 32, sidewalls 33, gussets 50 and 51 to form an extremely rigid central beam which deflects very little in response to lateral, longitudinal or roll forces inputted thereto from tire-wheel assemblies 9.

Referring again to FIG. 3, each outer housing 41 of central beam 16 extends intermediate one pair of pivot flanges 26 such that each opening 43 of bushings 42 aligns with holes 27 formed in pivot flanges 26. A pivot bolt or pin then passes through holes 27 and opening 43 in each bushing 42 to secure central beam 16 to suspension frame 5. Similarly, free end 61 of each control arms 17 is positioned between hanger brackets 22 such that central aperture 62 is aligned with holes 24 formed within hanger brackets 22 such that a pivot pin 81 passes therethrough to secure each control arms 17 intermediate hanger brackets 22 and to suspension frame 5.

Referring next to FIGS. 1 and 2, three air spring mounting plates 82 are mounted on top of horizontal portion 35 of top wall 31. Similarly, three mounting plates 83 are mounted to the slider such that an air spring 84 extends intermediate each mounting plate 82 and 83 for supporting the vertical load of vehicle 2. While three air springs are utilized in the preferred embodiment, any number of air springs may be utilized without departing from the spirit of the present invention.

Operationally, suspension system 1 permits axle 12 to pivot about pivot pins 80 and 81 during use and in response to loads inputted into suspension system 1 through tire-wheel assemblies 9. Specifically, suspension system 1 may be installed onto a usual vehicle 2 by positioning hanger brackets 22 on either side of slide channels 6 and welding the same thereto. Once suspension system 1 is secured to slide rails 6, axle 12 may be aligned by increasing or decreasing the length of one or both control arms 17. Specifically, central bar 58 may be rotated to increase or decrease the length of the turn-buckle style control arms 17. By increasing and decreasing the length of a single control arm 17, one end of axle 12 will be moved forwardly or rearwardly as adjustment requires. Central bar 58 may be rotated until tire-wheel assemblies 9 of axle 12 are aligned with the path of travel of the remaining tire-wheel assemblies of other axles attached to vehicle 2. As the length of control arms 17 is varied, bushings 42 will deflect within tubular outer housings 41 in order to assure that central beam 16 has sufficient compliance to move to a position substantially parallel to the path of travel of vehicle 2.

Additionally, the spring rate of bushings 42 may be varied in order to increase or decrease the roll compliance of the suspension system and therefore offer a roll stable suspension to vehicle 2 as discussed above. Still further, bushing 42 may be manufactured with varying spring rates, and more particularly, bushings 42 may include a vertical spring rate, and a horizontal spring rate different from the vertical spring rate as well as an axial spring rate which differs from both the horizontal spring rate and vertical spring rate thereby assuring that suspension system 1 may be tailored to meet the particular needs of vehicle 2.

In accordance with one of the main features of the invention, central beam 16 offers roll resistance and lateral stability to suspension system 1 via its welded interconnection with axle 12 and its bushed interconnection with suspension frame 5. Conversely, control arms 17 assists in reacting to longitudinal forces input into suspension system 1. As can be seen from a review of FIGS. 1–5, suspension system 1 substantially reduces the torque felt by axle 12 as central beam 16 supports axle 12 along substantially the entire length thereof. Specifically, roll and lateral forces input into central beam 16 will react at bushings 42, transfer into central beam 16, and out of central beam 16 through the other bushing 42. In this manner, a U-shaped roll beam is provided whereby the path of travel of lateral and roll forces input into suspension system 1 does not include axle 12. As such, the torque on axle 12 is substantially eliminated. Still further, inasmuch as central beam 16 attaches to axle 12 along a substantially large portion of its length, axle 12 is reinforced.

When suspension system 1 engages in diagonal axle walk or receives roll forces as a result of vehicle 2 negotiating a turn, bushings 42 will provide compliance in accordance with the design characteristics of suspension system 1. Suspension system 1 may be roll rigid or roll compliant depending on the spring rate of bushings 42 as well as the distance between bushings 42. As one end of axle 12 is raised, bushings 42 will offer resistance, and transfer roll loads through central beam 16 into the opposing bushing 42 and into the vehicle frame. As can be seen, inasmuch as beam 16 is attached to axle 12 adjacent its central portion, and along a large portion of its length, very little torque is imparted into axle 12, but rather axle 12 is subjected only to bending loads as a result of the movement of central beam 16 relative to tire-wheel assemblies 9. This bending moment is strongly resisted via the interconnection of axle 12 and central beam 16 through axle cradle 65.

Similarly, when lateral force is applied to tire-wheel assemblies 28, for example, when vehicle 2 negotiates a turn, a forward edge of one bushing 42 and a rear edge of the other bushing will move into compression thereby offering resistance to the movement of axle 12 as a result of the horizontal spring rate of bushings 42. However, when longitudinal forces are inputted into tire-wheel assemblies 9, for example, when the trailing beam suspension encounters an irregularity in the road surface, or abuts an upstanding wall, such as a curb, control arms 17 offers significant resistance against this movement as a result of the rigid interconnection between suspension frame 5 and axle 12. As can be seen, suspension system 1 offers a roll stable suspension which may be either roll flexible or roll rigid depending on the vertical spring rate of bushing 42 and the distance between outer housings 41. Additionally, suspension system 1 is resistant to lateral force as a result of the distance between bushings 42 and the fixed length of control arms 17 and to longitudinal forces as a result of control arms 17. Additionally, as lateral force is input into suspension system 1, and force reacts at bushings 42, suspension system 1 will not translate laterally, as control arms 17 are fixed in length and will not permit either end of axle 12 to move outwardly from pivots 80 and 81.

Inasmuch as axle 12 is positioned within axle cradle 65, central beam 16, control arms 17 and support frame 5 may be preassembled prior to introduction of axle 12 substantially reducing manufacturing costs.

Figure 6:
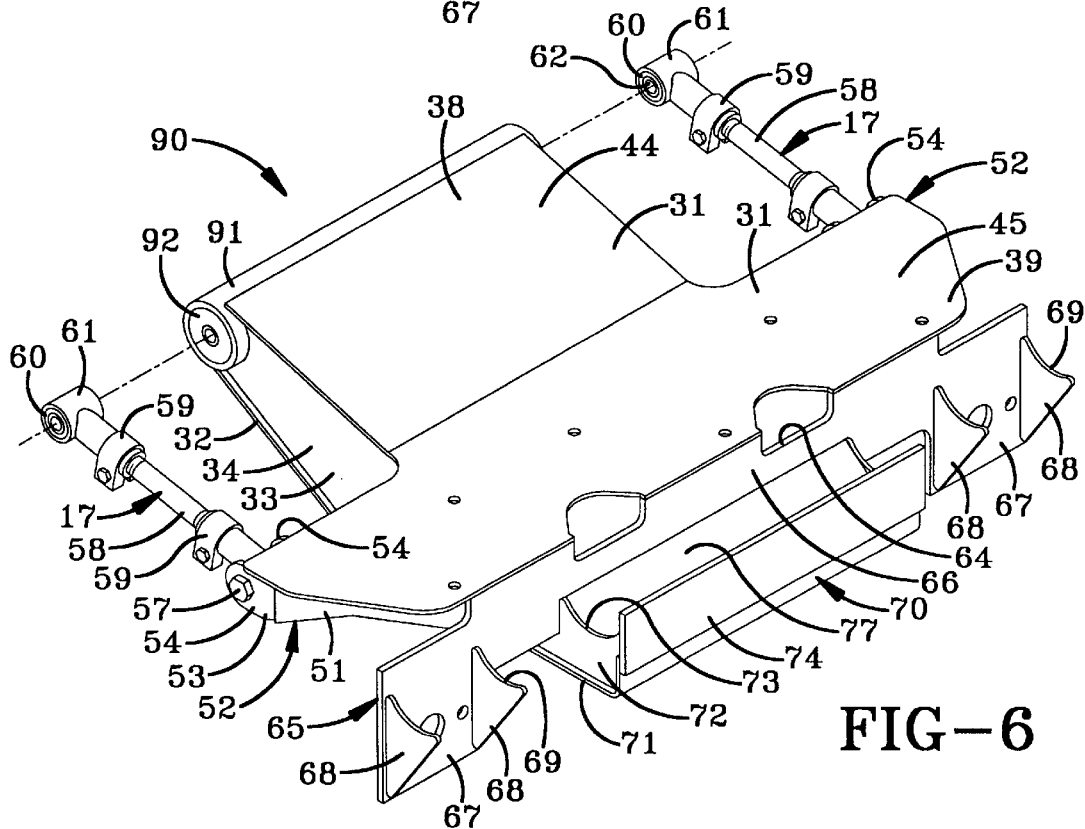
FIG. 6 is a perspective view of the beam shown in FIG. 4 with an alternative bushing.

Referring next to FIG. 6, an alternative central beam is provided. Specifically, an alternative central beam indicated generally at 90 is shown in FIG. 6. Central beam 90 is identical to central beam 16 except that it includes a single outer housing 91 housing a single bushing 92. Outer housing 91 is positioned between pivot flanges 26 in the manner described above such that a pivot pin 80 is positioned within bushing 92 to secure central beam 90 to suspension frame 5. Operationally, if a single bushing 92 is provided with an outer housing 91, variation between horizontal and vertical spring rates have less effect, and rather the conical spring rate of bushing 92 is critical and can be varied to create either a roll rigid or roll compliant suspension system depending upon the requirements of vehicle 2.

Figure 7:
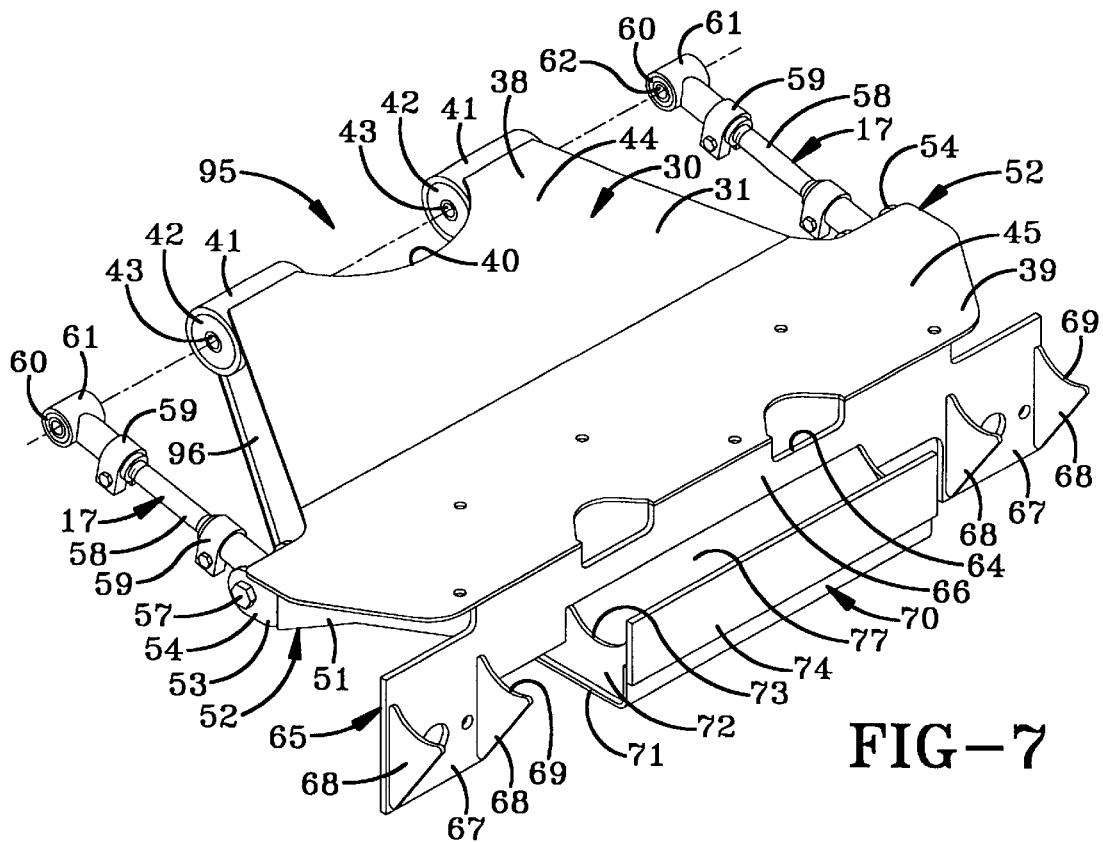
FIG. 7 is a perspective view of the beam and control arms of a second embodiment of the present invention.

A second embodiment of the central beam is shown in FIG. 7 and is indicated generally at 95. Alternative central beam 95 is identical to central beam 16 except it includes a pair of spaced apart sidewalls 96 angled away from one another from forward end 38 to rear end 39. As should be apparent from a review of FIGS. 6 and 7, central beam 95 could be provided with a single outer housing as shown in FIG. 6 without departing from the spirit of the present invention. The forward end of central beam 95 in the range of from 8 inches to 30 inches while the rear end has a length in the range of from 10 inches to 60 inches, while the beam attaches to the axle in the range of from 35% to 90% of the total axle length.

Figure 8:
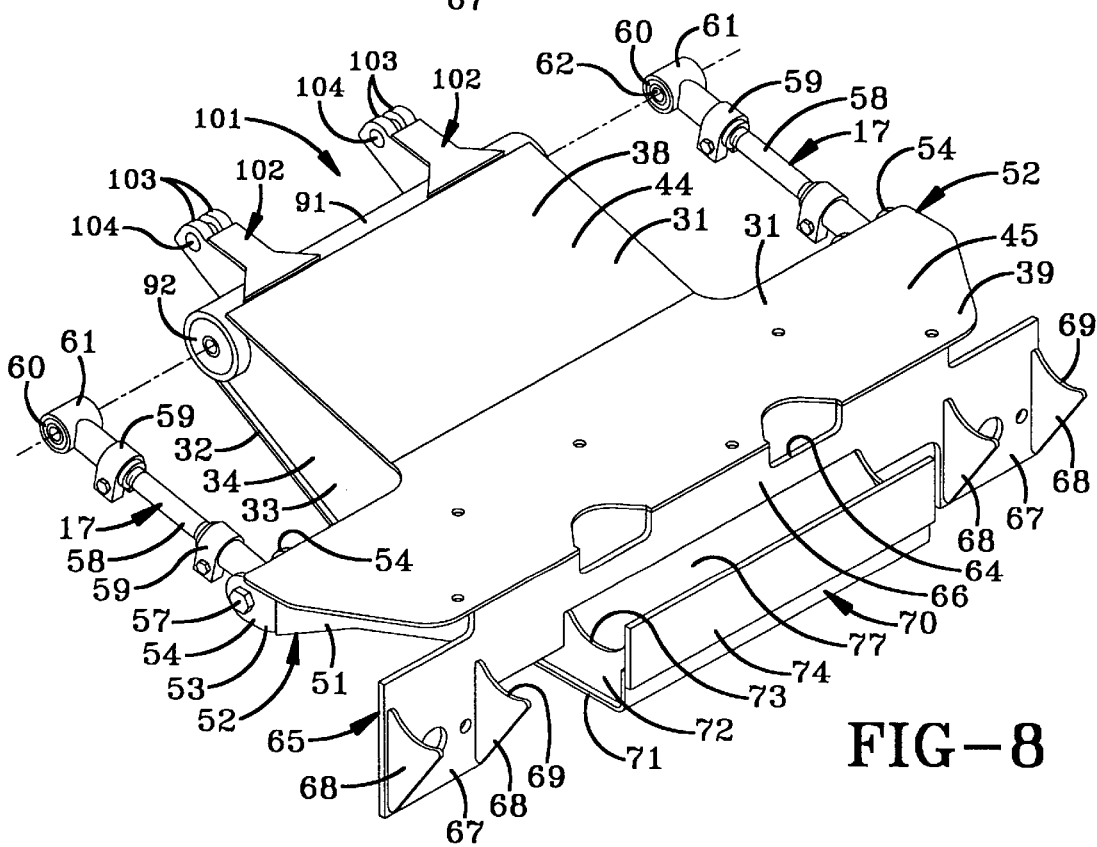
FIG. 8 is a perspective view of the beam and control arms of a third embodiment of the present invention.
Figure 9:
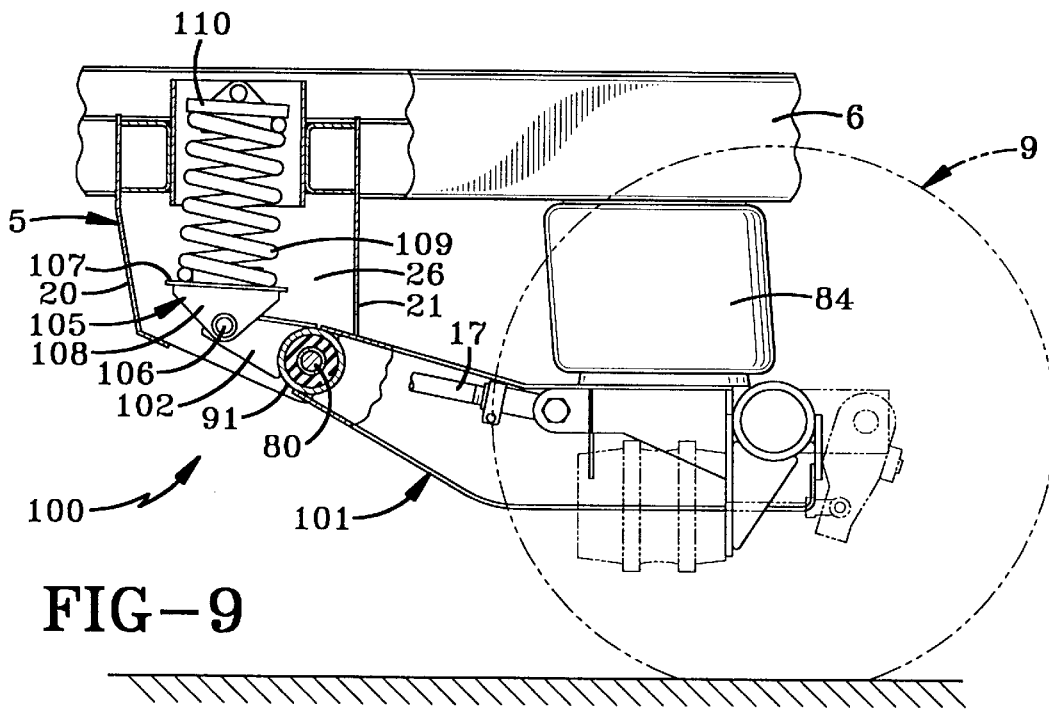
FIG. 9 is a side elevational view with portions cut away and shown in section of the third embodiment of the present invention shown in a first operating position.
Figure 10:
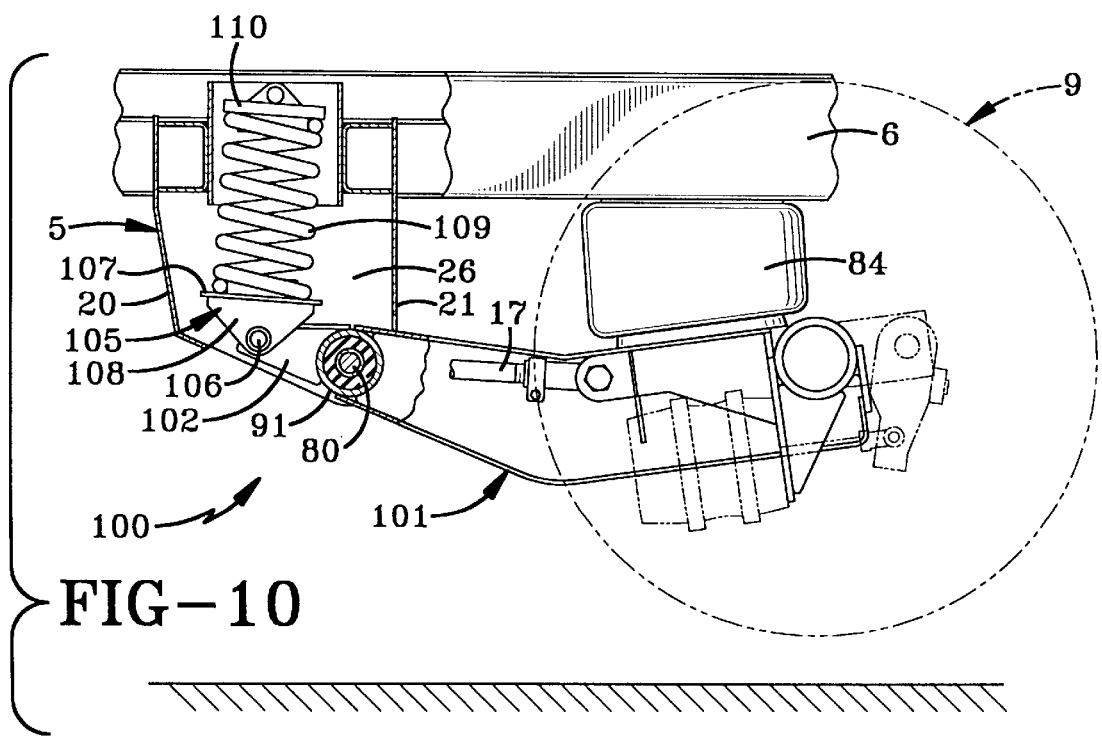
FIG. 10 is a side elevational view with portions cut away and shown in section of the third embodiment of the present invention shown in a second operating position.

Referring to FIGS. 8–10, a third embodiment of the invention is shown and is indicated generally at 100 with FIG. 8 depicting the central beam which is indicated generally at 101. Central beam 101 is identical to central beam 90 except that it includes a pair of spaced apart lift brackets 102 secured to outer housing 91. Each lift bracket 102 is formed with a pair of outwardly extending legs 103 having a hole 104 formed therein. A spring or lift weldment 105 is attached through holes 104 via a bolt 106 so as to provide pivotal movement between each lift bracket 102 and spring weldment 105. Lift weldment 105 includes a spring plate 107 and a pair of mounting flanges 108 extending downwardly therefrom. A coil spring 109 is supported from spring plate 107 and is compressed against a force plate 110 attached to suspension frame 5. Suspension system 100 operates identical to suspension system 1 except that when air spring 84 is deflated, coil spring 109 will provide force against lift bracket 102 welded to outer housing 91 opposite central beam 101 to apply a downward force thereto. As downward force is applied to lift bracket 102, central beam 101 will pivot about pivot pin 80 causing tire-wheel assembly 9 to move from the ground engaging position shown in FIG. 9 to the non-ground engaging position shown in FIG. 10. Similarly, when air spring 84 is inflated, the force within air spring 84 will cause central beam 101 to rotate downwardly from the position shown in FIG. 10 to the position shown in FIG. 9 thereby applying an upward force to lift bracket 102 compressing coil spring 109.

Figure 11:
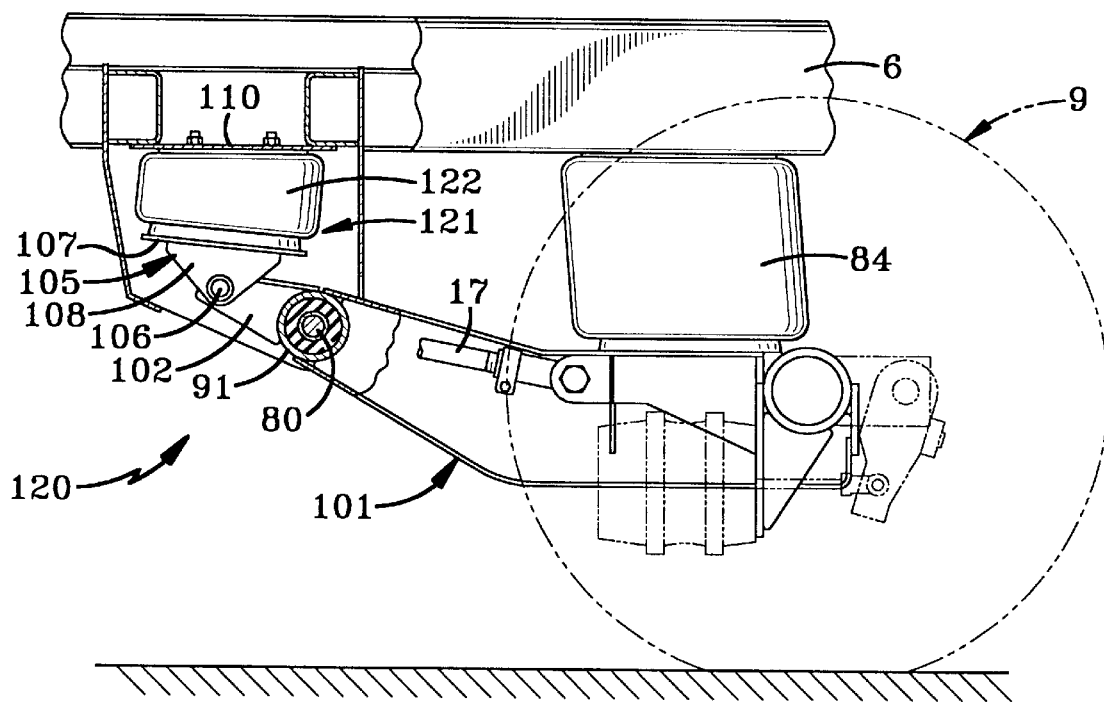
FIG. 11 is a side elevational view similar to FIG. 9 with an alternative lift mechanism.

Referring next to FIG. 11, a suspension system identical to suspension system 100 is shown and includes an alternative lift mechanism 121. Specifically, air spring 122 is provided between spring weldment 105 and force plate 110. Suspension system 120 operates identical to suspension system 1 except that air spring 122 may be inflated and deflated in order to move tire-wheel assembly 9 into and out of a ground engaging and a non-ground engaging position.

Accordingly, the invention described above, successfully overcomes problems associated in the art, and creates a suspension system which is roll stable, resistant to lateral and longitudinal forces, and which may be tailored to be roll flexible or roll rigid depending on the particular requirements of vehicle 2. Moreover, the suspension system with the present invention provides an air ride suspension system which is applicable as an auxiliary or primary suspension system, whether liftable or non-liftable. The suspension system of the present invention also effectively eliminates the torque felt by the axle, and provides for accurately aligning, and realigning the suspension system in a simple, and effective manner.

Accordingly, the improved center beam suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved center beam suspension system is constructed and used, the characteristics of the construction, and the advantageous, new and useful results obtained; the new and useful structures, devices, elements, arrangements, parts and combinations, are set forth in the appended claims.

I claim:

1. A suspension system adapted to be mounted to a vehicle frame comprising:

an axle;

a suspension frame;

a central beam having a pair of sides extending between the axle and suspension frame;

a control arm extending between the central beam and the suspension frame adjacent each side of the central beam;

at least one air spring adapted to be positioned intermediate the central beam and the vehicle frame; and at least one hanger bracket adapted for extending from the vehicle frame and for supporting the suspension system.

2. A suspension system adapted to be mounted to a vehicle frame comprising:

an axle;

a suspension frame;

a central beam non-rotatably secured to the axle and having a pair of spaced apart sidewalls and one of a top wall and a bottom wall extending between the axle and suspension frame;

a rigid control arm extending between the central beam and the suspension frame adjacent each side of the central beam;

at least one air spring adapted to be positioned intermediate the central beam and the vehicle frame;

at least one hanger bracket adapted for extending from the vehicle frame and for supporting the suspension system; and a lifting mechanism for moving the axle between a lowered position and a raised position.

3. The suspension system as defined in claim 2 in which the lifting mechanism includes a lift beam operationally connected to the axle whereby the lift beam includes a spring plate, in which a force plate is attached to the frame, and in which a lift spring is interposed between the spring plate and the force plate for moving the axle between a raised position and a lowered position.

4. The suspension system as defined in claim 3 in which the lift spring is one of an air spring and a coil spring.

5. The suspension system as defined in claim 3 in which a pivot means attaches the force plate to the frame.

6. The suspension system as defined in claim 3 in which a pivot means attaches the spring plate to the lift beam.

7. The suspension system as defined in claim 2 further comprising a central pivot for pivotally mounting the central beam to the suspension frame, and in which the center beam extends away from the central pivot in one direction, and in which the lift beam extends away from the central pivot in the opposite direction.

8. The suspension system as defined in claim 7 further comprising a central pivot for pivotally mounting the central beam to the suspension frame, and in which the lift mechanism is positioned forward of the central pivot.

\* \* \* \* \*